United States Patent [19]

Borho et al.

[11] Patent Number: 5,281,729

[45] Date of Patent: Jan. 25, 1994

[54] DRYING AND PURIFICATION OF BENZANTHRONE

[75] Inventors: Klaus Borho; Zafirios Grammatis, both of Mutterstadt; Karl-Heinz Hennicke, Bad Duerkheim; Wolfgang Mach, Hockenheim; Karl Mayer, Lambsheim; Karl-Heinz Sartor, Neuried; Wolf D. Stege, Ludwigshafen; Peter Thoma, Frankenthal; Ewald Vollmerhaus, Dirmstein, all of Fed. Rep. of Germany

[73] Assignee: BASF Aktiengesellschaft, Ludwigshafen, Fed. Rep. of Germany

[21] Appl. No.: 928,607

[22] Filed: Aug. 13, 1992

[30] Foreign Application Priority Data

Aug. 16, 1991 [DE] Fed. Rep. of Germany ....... 4127110

[51] Int. Cl.$^5$ ................................................ C09B 3/02
[52] U.S. Cl. ..................................................... 552/286
[58] Field of Search ......................................... 552/286

[56] References Cited

U.S. PATENT DOCUMENTS 1,591,715  7/1926  Lyford ................................ 552/286
1,794,848  3/1931  Gubelmann et al. ............... 552/286

Primary Examiner—Marianne M. Cintins
Assistant Examiner—Kimberly J. Kestler
Attorney, Agent, or Firm—Keil & Weinkauf

[57] ABSTRACT

A continuous closed-system process for the environmentally friendly drying and purification of benzanthrone which comprises the steps of charging a benzanthrone-containing paste of pumpable consistency onto a melt held in a stirred kettle, dewatering and melting the paste by means of steam, condensing the water vapor emerging from the stirred kettle, flaking the melt from the stirred kettle by means of a rotating drum, and packaging the flaked solids.

2 Claims, 2 Drawing Sheets

DRYING AND PURIFICATION OF BENZANTHRONE

BACKGROUND OF THE INVENTION

1. Field of the Invention

The present invention relates to a continuous process for the environmentally friendly drying and purification of benzanthrone.

2. Description of the Prior Art

Benzanthrone, a dye intermediate, is produced in two different grades: crude and pure.

At present, as-synthesized benzanthrone is separated off on filter presses, washed with water and expressed to a solids content of about 50% by weight. The water-moist filter cake is then dried batchwise in vacuum paddle dryers at about 150° C. and 600 mbar (absolute) to a residual water content of about 1% by weight. Dried benzanthrone crude still contains about 15% by weight of solid impurities, for example iron oxides and silicates, from the synthesis stage.

The subsequent purification of the dried, crude benzanthrone to give pure benzanthrone is carried out in sublimation furnaces at about 400° C. and 1 mbar (absolute). To this end, the dried, crude benzanthrone is manually introduced into metal pans which are then put into the sublimation furnaces. On heating and evacuation the benzanthrone sublimes out of the metal pans and desublimes onto the water-cooled walls of the sublimation furnace, from where it has to be knocked off manually after every batch. The pans likewise need to be cleaned by hand after every batch to remove the hard impurities left behind.

The disadvantage of the process as practiced is that it involves handling strongly dusting, allergenic products, which lead to appreciable problems not only within the plant where the process is practiced but also in further processing plants. At the original plant the problem areas are the open, labor-intensive manipulation of the product when filling and emptying the vacuum paddle dryer, when introducing the dry material onto the metal pans, when cleaning these pans and when knocking the desublimed product off the walls of the sublimation furnace. This manual work represents an appreciable dust nuisance and contamination hazard to work personnel.

SUMMARY OF THE INVENTION

It is an object of the present invention to make it possible to prepare benzanthrone without the aforementioned disadvantages.

We have found that this object is achieved by the defining features of claims 1 and 2.

BRIEF DESCRIPTION OF THE DRAWING

The process according to the present invention is depicted in its essential features in the drawings shown in FIG. 1 and 2, and will now be more particularly described.

The drawing shows on two sheets FIGS 1 and 2, a simplified process flow diagram.

DESCRIPTION OF THE PREFERRED EMBODIMENTS

Figure 1:
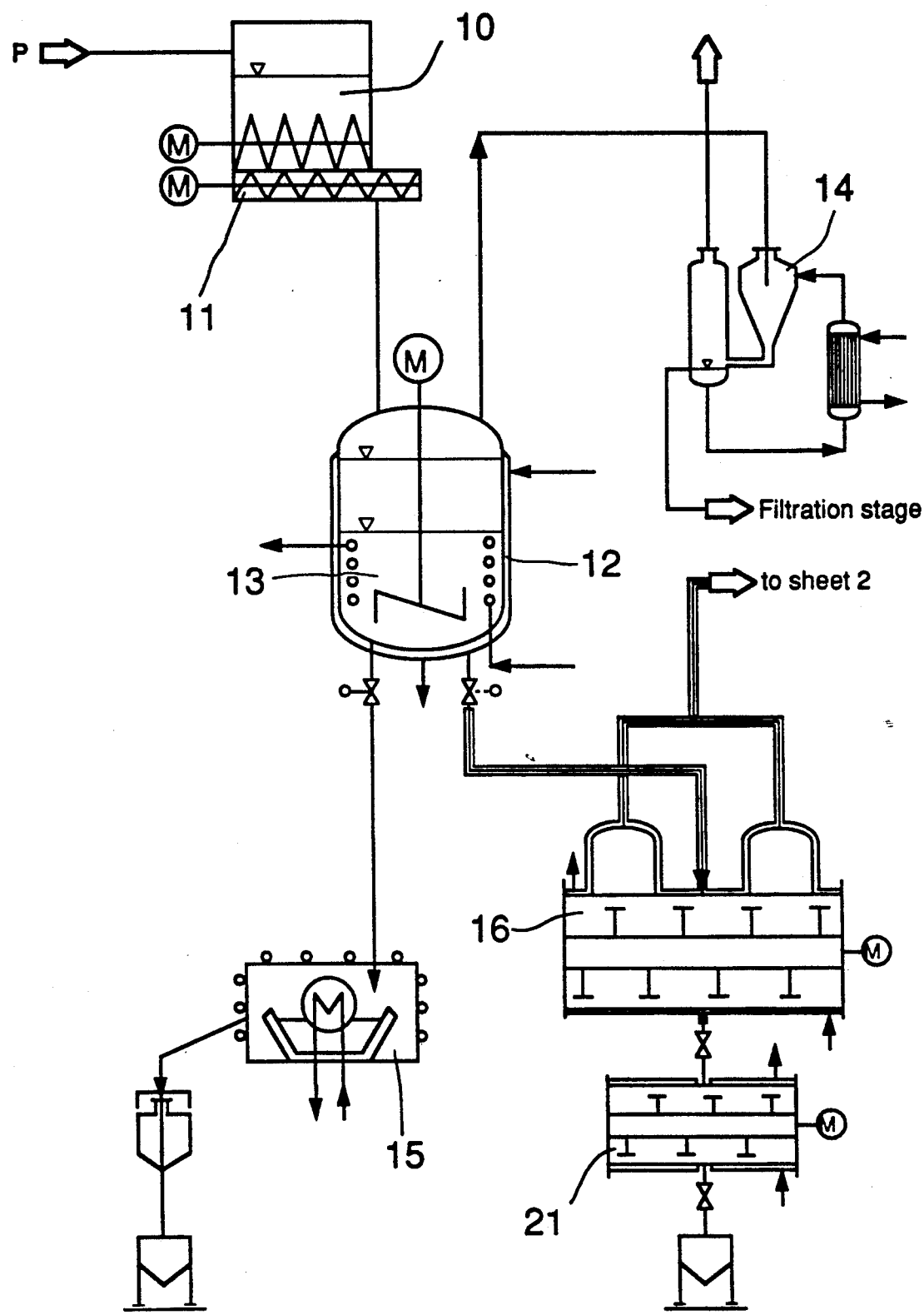
Figure 2:
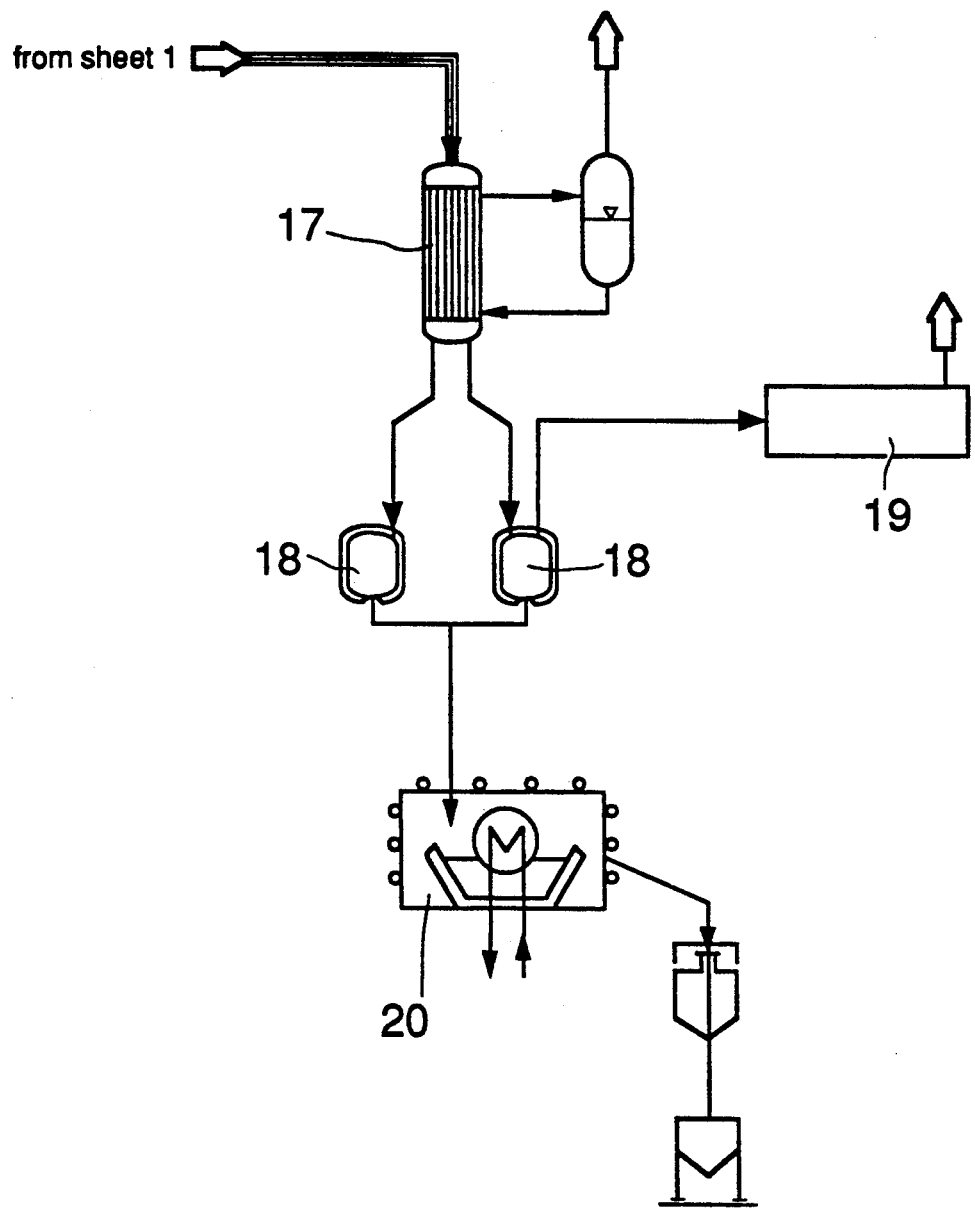

Referring now to the diagram, a benzanthronecontaining press cake P is transported by means of tubs and mechanical conveying means from a filter press into a mixer-equipped vessel 10. After a pasty, pumpable consistency has been achieved, the paste is continuously metered by a conveying element 11—preferably an eccentric screw pump—onto a melt 13 situated within a stirred kettle 12. The stirrer in the kettle is preferably an impeller stirrer and it ensures intensive mixing of the paste with the melt, in the course of which the paste is spontaneously dewatered and melted. The thermal energy required is supplied to the stirred kettle by means of steam via a heating coil immersed in the melt and also via a jacket. The water vapor emerging from the stirred kettle is condensed—preferably in a jet washer 14—and reused as washing liquor in the filtration stage. The process step described is carried out at a pressure of 1 bar. In one version of the process, the crude benzanthrone melt is then continuously discharged from the stirred kettle, through a floor outlet valve, onto a, preferably immersed, rotating drum 15 at a rate dictated by the f ill level of the pan into which the drum dips. The drum itself is cooled and the pan is heated. The resulting flakes are packed in containers as crude grade benzanthrone. To prevent dust and gas emissions in the packing of the flakes it is advantageous to employ customary aspiration means comprising a ventilator and an appropriate filter.

Alternatively, the crude benzanthrone melt is discharged batchwise from the stirred kettle, again through a floor outlet valve, onto a vacuum dryer 16, preferably a Discotherm vacuum dryer (hereinafter simply dryer), at a dryer fill level of about 80% by volume. As the dryer is being filled, it is under atmospheric pressure and at a hot wall temperature of about 300° C. Then the dryer is evacuated to about 8 mbar (absolute). The dryer is heated with heat transfer oil. To achieve a very low level of residual benzanthrone in the residue, the hot wall temperature can be raised to 330° C. max in the final phase of drying.

The benzanthrone vapor emerging from the dryer during drying is condensed in a vertical in-tube condenser 17, in which the vapor flows downward and condensation takes place inside the tubes of the tube bundle. The condensate is collected in alternate kettles 18. The heat of condensation is removed by indirect evaporative cooling at 180° C., i.e. by steam generation (9 bar absolute) around the tubes of the tube bundle condenser.

Vacuum production is effected by a multistage vacuum range 19, comprising a two-stage steam jet vacuum pump, a condenser and a water mains vacuum pump.

The flaking of the pure benzanthrone melt from the kettles 18 onto the continuously operated rotating drum 20 is carried out in the same way as the crude benzanthrone flaking. The likely purity of the recovered pure grade benzanthrone is about 98% by weight. The resulting flaked solids are packed in containers as pure grade benzanthrone.

The granular/pulverulent residue remaining in the dryer 16 at the end of drying is pyrophoric when hot. After the dryer has been blanketed with nitrogen, the residue is discarded through a gastight floor outlet valve into a nitrogen-inertized, water-cooled paddle dryer 21, where it is cooled to about 50° C. and then containered.

We claim:

1. A closed-system process for the drying and purification of benzanthrone, comprising the steps of a) filtering a composition benzanthrone and water in a filter press to prepare a press cake comprising benzanthrone and water,
b) transporting the press cake from the filter press by mechanical conveying means into a mixer-equipped vessel,
c) mixing the press cake in the mixer-equipped vessel until a pasty, pumpable consistency has been achieved,
d) transporting the thus-prepare paste by a conveying means into a closed stirred kettle containing a melt comprising benzanthrone and water,
e) mixing the paste with the melt and heating the mixture to dewater and melt the benzanthrone and to produce water vapor,
f) passing the water vapor from the closed stirred kettle, condensing the water vapor to produce water, and reusing the water as a washing liquor in the filtration step,
g) discharging the benzanthrone melt through a valve into a rotating drum where benzanthrone flakes are produced, and
h) packing the benzanthrone flakes into container.

2. A closed-system process for the drying and purification of benzanthrone, comprising the steps of
a) filtering a composition comprising benzanthonre and water in a filter press to prepare a press cake comprising benzanthrone and water,
b) transporting the press cake from the filter press by mechanical conveying means into a mixer-equipped vessel,
c) mixing the press cake in the mixer-equipped vessel until a pasty, pumpable consistency has been achieved,
d) transporting the thus-prepared paste by a conveying means into a closed stirred kettle containing a melt comprising benzanthrone and water,
e) mixing the paste with the melt and heating the mixture to dewater and melt the benzanthrone and to produce water vapor,
f) passing the water vapor from the closed stirred kettle, condensing the water vapor to produce water, and reusing the water as a washing liquor in the filtration step,
g) discharging the benzanthrone melt through a valve into a vacuum dryer, partially evacuating the vacuum dryer and heating the vacuum dryer to produce a benzanthrone vapor in the dryer,
h) discharging the benzanthrone vapor form the dryer into a tube condenser, condensing the benzanthrone and collecting the benzanthrone in a closed kettle,
i) discharging the benzanthrone into a rotating drum where benzanthrone flakes are produced, and packaging the benzanthrone flakes into containers.

* * * * *

UNITED STATES PATENT AND TRADEMARK OFFICE
CERTIFICATE OF CORRECTION

PATENT NO.: 5,281,729

DATED: January 25, 1994

INVENTOR(S): BORHO et al.

It is certified that error appears in the above-identified patent and that said Letters Patent is hereby corrected as shown below:

Column 3, claim 1, line 23, "container" should be --containers--.

Signed and Sealed this

Twenty-seventh Day of September, 1994

Attest:

BRUCE LEHMAN

Attesting Officer     Commissioner of Patents and Trademarks